(12) United States Patent
Komuro et al.

(10) Patent No.: US 12,266,149 B2
(45) Date of Patent: Apr. 1, 2025

(54) OWN-POSITION ESTIMATING DEVICE, MOVING BODY, OWN-POSITION ESTIMATING METHOD, AND OWN-POSITION ESTIMATING PROGRAM

(71) Applicant: KABUSHIKI KAISHA TOYOTA JIDOSHOKKI, Kariya (JP)

(72) Inventors: Tatsuya Komuro, Kariya (JP); Norihiko Kato, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 373 days.

(21) Appl. No.: 17/788,498

(22) PCT Filed: Dec. 24, 2020

(86) PCT No.: PCT/JP2020/048488
§ 371 (c)(1),
(2) Date: Jun. 23, 2022

(87) PCT Pub. No.: WO2021/132477
PCT Pub. Date: Jul. 1, 2021

(65) Prior Publication Data
US 2023/0039143 A1 Feb. 9, 2023

(30) Foreign Application Priority Data
Dec. 26, 2019 (JP) .................... 2019-236687

(51) Int. Cl.
*G06V 10/44* (2022.01)
*G06T 7/73* (2017.01)
*G06V 10/98* (2022.01)

(52) U.S. Cl.
CPC .............. *G06V 10/443* (2022.01); *G06T 7/73* (2017.01); *G06V 10/993* (2022.01)

(58) Field of Classification Search
CPC .... G06V 10/443; G06V 10/993; G06V 10/40; G06V 10/764; G06V 10/82; G06T 7/73;
(Continued)

(56) References Cited

U.S. PATENT DOCUMENTS 9,584,768 B2 * 2/2017 Aratani ................. G06T 7/0002
9,626,806 B2 * 4/2017 Kaino ....................... G06T 7/70
(Continued)

FOREIGN PATENT DOCUMENTS

JP 2011-215054 A 10/2011
JP 2019-053462 A 4/2019
(Continued)

OTHER PUBLICATIONS

Communication dated Nov. 22, 2023 issued by the European Patent Office in application No. 20905092.1.
(Continued)

*Primary Examiner* — Michael S Osinski
(74) *Attorney, Agent, or Firm* — Sughrue Mion, PLLC

(57) ABSTRACT

An own-position estimating device for estimating an own-position of a moving body by matching a feature extracted from an acquired image with a database in which position information and the feature are associated with each other in advance, includes an estimating unit estimating the own-position of the moving body by matching the feature extracted by the extracting unit with the database, and a determination threshold value adjusting unit adjusting a determination threshold value for extracting the feature, in which the determination threshold value adjusting unit acquires the database in a state in which the determination threshold value is adjusted, and adjusts the determination threshold value on the basis of the determination threshold value linked to each of the position information items in the database, and the extracting unit extracts the feature from the
(Continued)

image by using the determination threshold value adjusted by the determination threshold value adjusting unit.

7 Claims, 13 Drawing Sheets

(58) Field of Classification Search
CPC . G06T 2207/10016; G06T 2207/30244; G06T 2207/30252; G06T 7/70; G06T 2207/10028; G06T 2207/20164; G06T 2207/30204; G05D 1/2462; G05D 1/243; G05D 2105/28; G05D 2107/70; G05D 2109/10; G05D 2111/10; G06F 18/2413; G06F 18/24; G06F 18/2411; G06F 18/253

See application file for complete search history.

(56) References Cited

U.S. PATENT DOCUMENTS

| | | | | |
|---|---|---|---|---|
| 10,181,086 | B2* | 1/2019 | Lee | G06F 18/2413 |
| 10,832,445 | B2* | 11/2020 | Gu | G06T 7/20 |
| 10,897,569 | B2* | 1/2021 | Qian | H04N 23/635 |
| 11,550,025 | B2* | 1/2023 | Palatov | G01S 5/14 |
| 11,704,815 | B2* | 7/2023 | Ichikawa | G06T 7/70 |
| | | | | 348/143 |
| 2011/0038540 | A1* | 2/2011 | Ahn | G06V 10/462 |
| | | | | 382/173 |
| 2016/0238394 | A1 | 8/2016 | Iimura et al. | |
| 2020/0263994 | A1* | 8/2020 | Lee | G06T 7/74 |
| 2020/0363202 | A1* | 11/2020 | Metzler | G06T 7/80 |
| 2020/0402256 | A1 | 12/2020 | Kobayashi et al. | |
| 2021/0012142 | A1* | 1/2021 | Yamaguchi | H04N 23/73 |
| 2021/0049398 | A1* | 2/2021 | Kurita | G06V 10/806 |
| 2021/0082143 | A1 | 3/2021 | Lee | |
| 2021/0103751 | A1* | 4/2021 | Lee | G06V 10/454 |
| 2021/0142484 | A1* | 5/2021 | Yamamoto | G06N 20/10 |
| 2021/0174539 | A1* | 6/2021 | Duong | G06N 5/01 |
| 2021/0304436 | A1* | 9/2021 | Takemoto | G06T 7/85 |
| 2021/0390301 | A1* | 12/2021 | Zhu | G05D 1/0246 |
| 2022/0067960 | A1* | 3/2022 | Guo | G06T 7/50 |
| 2022/0148302 | A1* | 5/2022 | Bao | G06V 10/761 |
| 2022/0165044 | A1* | 5/2022 | Tominaga | G06V 10/25 |
| 2022/0291686 | A1* | 9/2022 | Yoshimura | G05D 1/0221 |
| 2022/0383518 | A1* | 12/2022 | Zhang | G06V 10/761 |
| 2022/0412741 | A1* | 12/2022 | Wakabayashi | G06T 19/006 |

FOREIGN PATENT DOCUMENTS

| | | |
|---|---|---|
| WO | 2015/049717 A1 | 4/2015 |
| WO | 2019/130945 A1 | 7/2019 |
| WO | 2019/131198 A1 | 7/2019 |

OTHER PUBLICATIONS

Translation of the International Preliminary Report on Patentability dated Jun. 28, 2022 in International Application No. PCT/JP2020/048488.

Extended European Search Report dated Jan. 3, 2023 in European Application No. 20905092.1.

International Search Report dated Mar. 9, 2021 from the International Searching Authority in International Application No. PCT/JP2020/048488.

* cited by examiner

OWN-POSITION ESTIMATING DEVICE, MOVING BODY, OWN-POSITION ESTIMATING METHOD, AND OWN-POSITION ESTIMATING PROGRAM

CROSS REFERENCE TO RELATED APPLICATIONS

This application is a National Stage of International Application No. PCT/JP2020/048488 filed Dec. 24, 2020, claiming priority based on Japanese Patent Application No. 2019-236687 filed Dec. 26, 2019.

TECHNICAL FIELD

The present disclosure relates to an own-position estimating device, a moving body, an own-position estimating method, and an own-position estimating program.

BACKGROUND ART

An own-position estimating device described in Patent Literature 1 is known as an own-position estimating device of the related art, Such an own-position estimating device extracts and tracks feature points of an object from time-series images that are input in order from an image input unit. Then, the own-position estimating device estimates the own-position of a moving body by matching the calculated feature point with map information. Such an own-position estimating device increases an accuracy by highly selecting the feature points to be tracked.

CITATION LIST

Patent Literature

Patent Literature 1: international Publication WO 2015-049717

SUMMARY OF INVENTION

Technical Problem

Here, in a case where a feature is extracted from an image, the number of features or the distribution of the features may be uneven in accordance with a travel position of the moving body. For example, in a case where there are few features to be extracted or in a case where there is a bias in the distribution, the accuracy of own-position estimation decreases. In addition, in a case where there are too many features to be extracted, a processing speed decreases, and it is difficult to estimate the own-position in real time.

Accordingly, an object of the present disclosure is to provide an own-position estimating device, a moving body, an own-position estimating method, and an own-position estimating program, in which the own-position can be estimated in real time with a high accuracy regardless of a travel position of the moving body.

Solution to Problem

An own-position estimating device according to one aspect of the present disclosure is an own-position estimating device for estimating an Own-position of a moving body by matching a feature extracted from an acquired image with a database in which position information and the feature are associated with each other in advance, the device including: an image acquiring unit acquiring the image; an extracting unit extracting the feature from the image acquired by the image acquiring unit; an estimating unit estimating the own-position of the moving body by matching the feature extracted by the extracting unit with the database; and a determination threshold value adjusting unit adjusting a determination threshold value for extracting the feature, in which the determination threshold value adjusting unit acquires the database in a state in which the determination threshold value is adjusted, and adjusts the determination threshold value on the basis of the determination threshold value linked to each of the position information items in the database, and the extracting unit extracts the feature from the image by using the determination threshold value adjusted by the determination threshold value adjusting unit.

The own-position estimating device is for estimating the own-position of the moving body by matching the feature extracted from the acquired image with the database in which the position information and the feature are associated with each other in advance. Here, in a case where the extracting unit uses only a constant determination threshold value when extracting the feature from the image, the number of features or the distribution of the features may be uneven in accordance with a travel position of the moving body. In contrast, the own-position estimating device according to the present disclosure includes the determination threshold value adjusting unit adjusting the determination threshold value for extracting the feature. The determination threshold value adjusting unit acquires the database in the state where the determination threshold value is adjusted, and adjusts the determination threshold value on the basis of the determination threshold value linked to each of the position information items in the database. According y, the determination threshold value adjusting unit is capable of adjusting the deter urination threshold value to a suitable value, in accordance with the travel position of the moving body. The extracting unit is capable of extracting the feature from the image in a state where the number of features or the distribution of the features is prevented from being uneven, by using the determination threshold value adjusted to the suitable value as described above. Accordingly, the own-position estimating device is capable of suppressing a decrease in the accuracy of own-position estimation due to few features to be extracted and a bias in the distribution. In addition, the own-position estimating device is capable of suppressing a decrease in a processing speed due to too many features to be extracted. As described above, the own-position estimating device is capable of estimating the own-position in real time with a high accuracy regardless of the travel position of the moving body.

The determination threshold value adjusting unit, for example, may adjust at least one of a light-dark threshold value for determining whether a surrounding pixel is bright or dark with respect to a determination pixel to be determined as the feature or not, and a corner threshold value for determining the number of consecutive surrounding pixels determined to be bright or dark, as the determination threshold value.

An image linked to predetermined position information in the database may be divided into a plurality of areas, and the determination threshold values may be different from each other in one area and the other area. Accordingly even in a position where the distribution of the features is likely to be biased in the image, the extracting unit is capable of extracting the feature with a suitable determination threshold value according to the area The extracting unit may determine whether or not a distribution mode of the extracted features is changed from that of the database. In a case where the distribution mode of the extracted features is changed from that of the database, an abnormality such as a change in the surrounding environment may occur in which own-position estimation with an excellent accuracy cannot be performed. Accordingly, it is possible to take measures by the extracting unit determining the situation described above.

A position in which the number of features is less than a predetermined amount even when adjusting the determination threshold value may be registered as a travel caution area in the database. In this case, it is possible to rapidly take measures when the moving body travels in the travel caution area.

An own-position estimating device according to one aspect of the present disclosure is an own-position estimating device for estimating an own-position of a moving body by matching a feature extracted from an acquired image with a database in which position information and the feature are associated with each other in advance, the device including: an image acquiring unit acquiring the image; an extracting unit extracting the feature from the image acquired by the image acquiring unit; and a determination threshold value adjusting unit adjusting a determination threshold value for extracting the feature, in which the determination threshold value adjusting unit evaluates a distribution mode of the features extracted from the image acquired by the image acquiring unit, and adjusts the determination threshold value for extracting the feature on the basis of an evaluation result, and the extracting unit extracts the feature from the image by using the determination threshold value adjusted by the determination threshold value adjusting unit.

A moving body according to one aspect of the present disclosure includes the own-position estimating device described above.

An own-position estimating method according to one aspect of the present disclosure is an own-position estimating method for estimating an own-position of a moving body by matching a feature extracted from an acquired image with a database in which position information and the feature are associated with each other in advance, the method including: an image acquisition step of acquiring the image; an extraction step of extracting the feature from the image acquired in the image acquisition step; an estimation step of estimating the own-position of the moving body by matching the feature extracted in the extraction step with the database; and a determination threshold value adjustment step of adjusting a determination threshold value for extracting the feature, in which in the determination threshold value adjustment step, the database in a state in which the determination threshold value is adjusted is acquired, and the determination threshold value is adjusted on the basis of the determination threshold value linked to each of the position information items in the database, and in the extraction step, the feature is extracted from the image by using the determination threshold value adjusted in the determination threshold value adjustment step.

An own-position estimating program according to one aspect of the present disclosure is an own-position estimating program for estimating an own-position of a moving body by matching a feature extracted from an acquired image with a database in which position information and the feature are associated with each other in advance, the program allowing a controller to execute: an image acquisition step of acquiring the image; an extraction step of extracting the feature from the image acquired in the image acquisition step; an estimation step of estimating the own-position of the moving body by matching the feature extracted by an extracting unit with the database; and a determination threshold value adjustment step of adjusting a determination threshold value for extracting the feature, in which in the determination threshold value adjustment step, the database in a state in which the determination threshold value is adjusted is acquired, and the determination threshold value is adjusted on the basis of the determination threshold value linked to each of the position information items in the database, and in the extraction step, the feature is extracted from the image by using the determination threshold value adjusted in the determination threshold value adjustment step.

According to the own-position estimating device, the moving body, the own-position estimating method, and the own-position estimating program, it is possible to obtain the same effects as those of the own-position estimating device described above.

Advantageous Effects of Invention

According to the present disclosure, it is possible to provide an own-position estimating device, a moving body; an own-position estimating method, and an own-position estimating program, in which the own-position can be estimated in real time with a high accuracy regardless of a travel position of the moving body.

DESCRIPTION OF EMBODIMENTS

Hereinafter, an embodiment of the present disclosure will be described in detail with reference to the drawings.

Figure 1:
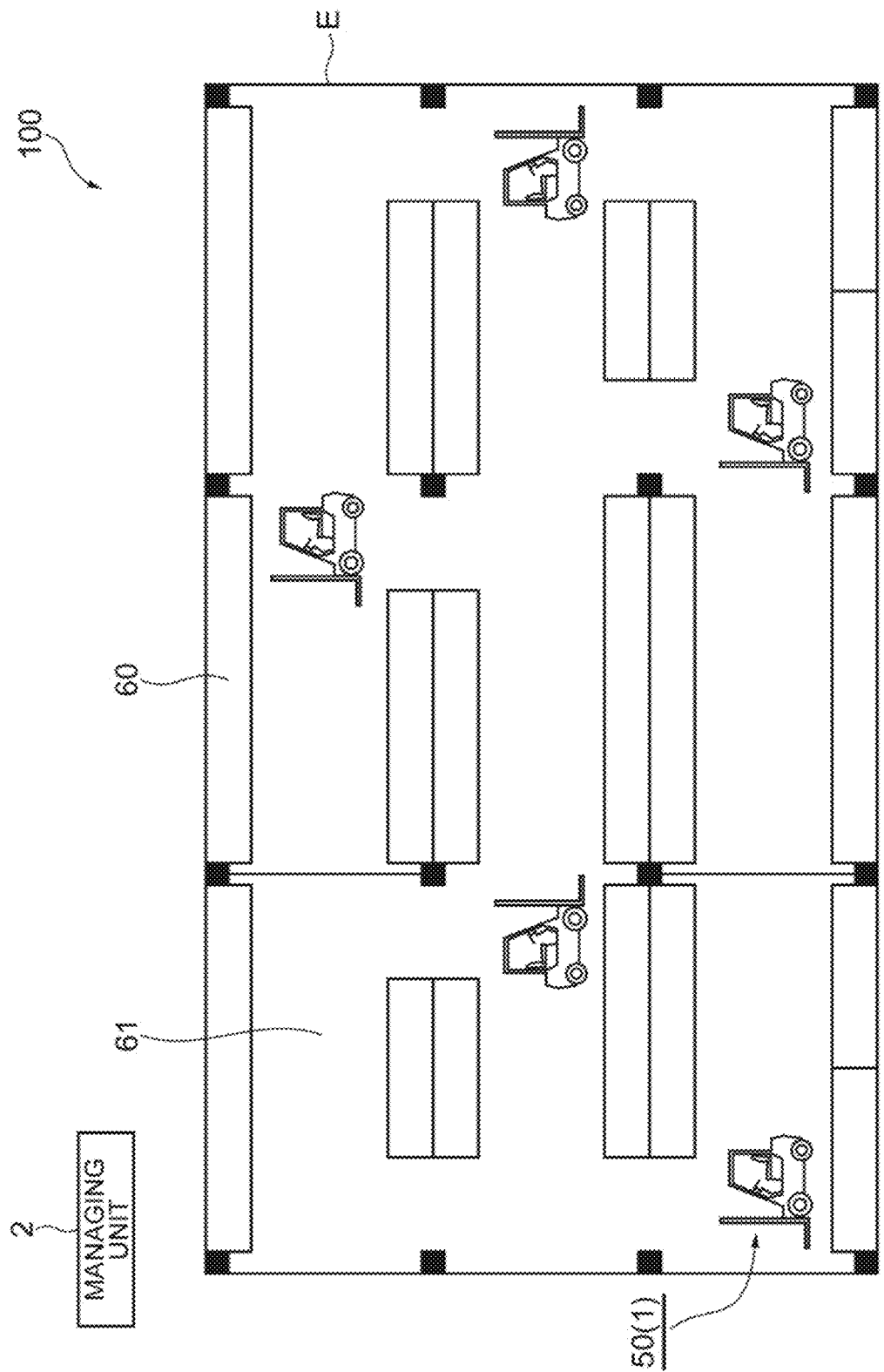
FIG. 1 is a schematic view illustrating an own-position estimating system including an own-position estimating device according to an embodiment of the present disclosure.

FIG. 1 is a schematic view illustrating an own-position estimating system 100 including an own-position estimating device 1 according to this embodiment. As illustrated in FIG. 1, the own-position estimating system 100 includes an own-position estimating device 1 provided in each of a plurality of moving bodies 50, and a managing unit 2.

In this embodiment, a forklift is exemplified as the moving body 50. In FIG. 1, a state is illustrated in which the forklift as the moving body 50 performs a cargo unloading operation in a workspace E (a predetermined region) such as a warehouse or a factory. In the workspace E, a plurality of shelves 60 are disposed. In addition, a passage 61 for the moving body 50 to pass through is formed between the shelf 60 and the shelf 60. The own-position estimating device 1 is a device estimating the own-position of the moving body 50 in the workspace E. The own-position estimating device 1 estimates the own-position of the moving body 50 by matching a feature extracted from an acquired image with a database in which position information and the feature are associated with each other in advance. The moving body 50 is capable of autonomously traveling in the workspace E by using the own-position estimated by the Own-position estimating device 1. Note that, the detailed configuration of the own-position estimating device 1 will be described below. The managing unit 2 is a server managing the plurality of moving bodies 50 in the workspace E The managing unit 2 receives predetermined information from the plurality of moving bodies 50, and transmits predetermined information to the plurality of moving bodies 50, as necessary.

Figure 2:
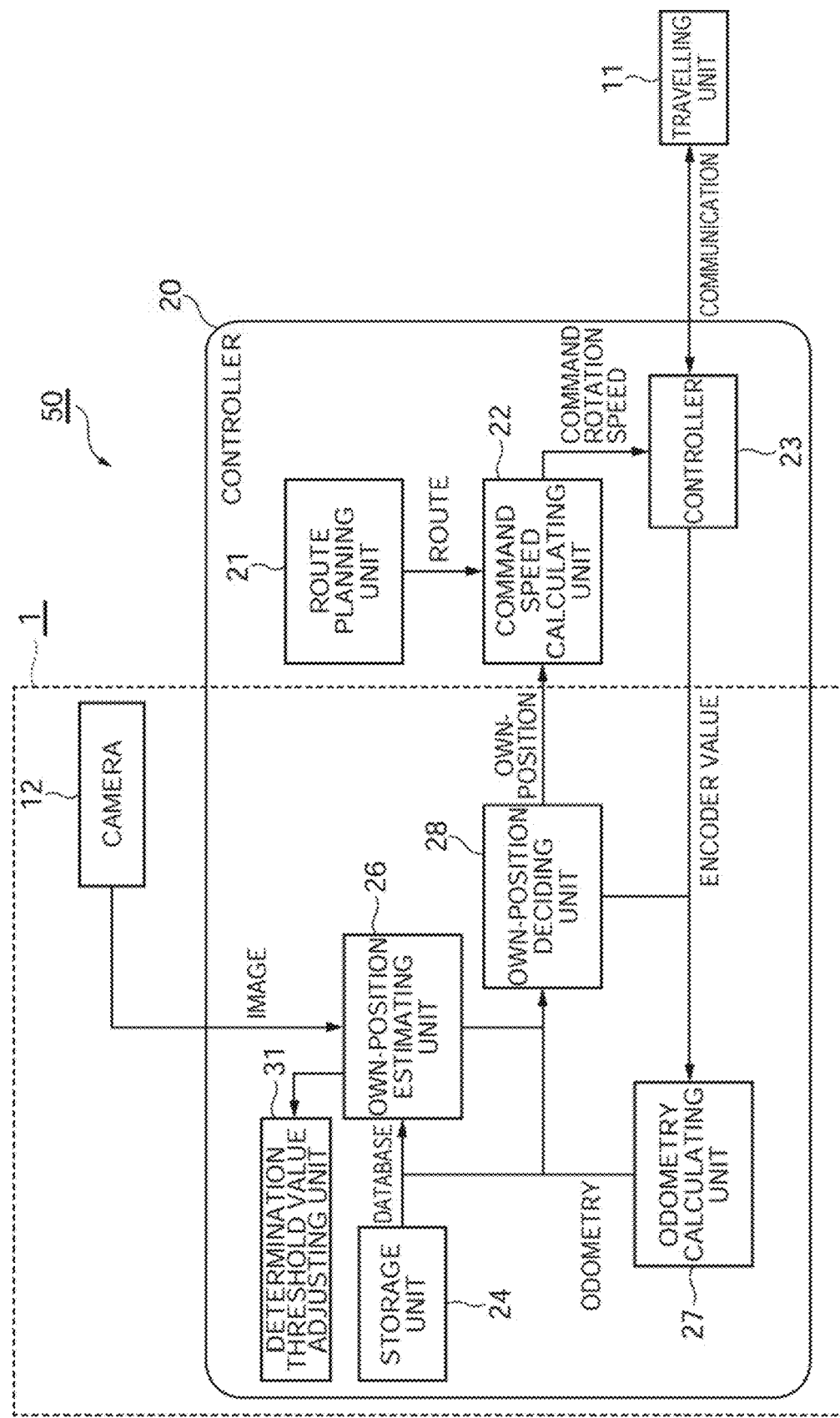
FIG. 2 is a block configuration diagram illustrating a block configuration of a moving body including the own-position estimating device according to the embodiment of the present disclosure.

FIG. 2 is a block configuration diagram illustrating a block configuration of the moving body 50 including the own-position estimating device 1 according to this embodiment. As illustrated in FIG. 2, the moving body 50 includes a traveling unit 11, a camera 12 (an image acquiring unit), and a controller 20. The traveling unit 11 is a driving system generating a driving force for the moving body 50 to travel, such as a motor. The camera 12 is a device acquiring the surrounding image of the moving body 50. The camera 12 transmits the acquired image to an own-position estimating unit 26.

The controller 20 includes an electronic control unit [ECU] comprehensively managing the moving body 50. ECU is an electronic control unit including a central processing unit [CPU], a read only memory [ROM], a random access memory [RAM], a controller area network [CAN] communication circuit, and the like. In ECU, for example, various functions are attained by loading a program stored in ROM to RAM, and by executing the program loaded to RAM in CPU. The controller 20 includes a route planning unit 21, a command speed calculating unit 22, a communication unit 23, a storage unit 24, the own-position estimating unit 26, an odometry calculating unit 27, an own-position deciding unit 28, and a determination threshold value adjusting unit 31. Among them, the storage unit 24, the own-position estimating unit 26 (an extracting unit and an estimating unit), the odometry calculating unit 27, the own-position deciding unit 28, the determination threshold value adjusting unit 31, and the camera 12 configure the own-position estimating device 1.

The route planning unit 21 plans a route for the moving body 50 to move. The route planning unit 21 sets a departure position and a destination position in the workspace E, and plans a route to the destination position. The route planning unit 21 transmits information of the planned route to the command speed calculating unit 22. The command speed calculating unit 22 calculates a command speed with respect to the traveling unit 11, that is, a command rotation speed with respect to the motor. The command speed calculating unit 22 calculates the command rotation speed on the basis of the route transmitted from the route planning unit 21 and the own-position transmitted from the own-position deciding unit 28. The communication unit 23 performs communication with respect to the traveling unit 11. The communication unit 23 transmits a control signal required for travel to the traveling unit 11. Note that, the communication unit 23 acquires an encoder value from an encoder that is not illustrated, and transmits the encoder value to the odometry calculating unit 27.

Next, each constituent of the own-position estimating device 1 will be described. The storage unit 24 stores the database required for own-position estimation. The database is an information group in which the position information and the feature extracted from the image acquired in the position are associated with each other in advance. The storage unit 24 transmits the database to the own-position estimating unit 26.

Returning to FIG. 2, the own-position estimating unit 26 extracts the feature from the image acquired by the camera 12. In addition, the own-position estimating unit 26 estimates the own-position of the moving body 50 by matching the feature extracted from the image acquired by the camera 12 with the database transmitted from the storage unit 24. The own-position estimating unit 26 transmits the estimated own-position to the own-position deciding unit 28.

The odometry calculating unit 27 calculates the own-position according to odometry on the basis of the encoder value acquired from the communication unit 23. The odometry calculating unit 27 is capable of acquiring the own-position by easy calculation without using the image of the camera 12. The odometry calculating unit 27 transmits the own-position according to odometry to the own-position deciding unit 28. The own-position deciding unit 28 comprehensively determines the own-position from the own-position estimating unit 26 and the own-position from the odometry calculating unit 27, and decides the own-position of the moving body 50. The own-position deciding unit 28 transmits the decided own-position to the command speed calculating unit 22.

The determination threshold value adjusting unit 31 adjusts a determination threshold value for extracting the feature. The determination threshold value adjusting unit 31 adjusts at least one of a light-dark threshold value and a corner threshold value, described below, as the determination threshold value. Note that, the determination threshold value adjusting unit 31 will be described in detail after describing a method for preparing the database.

Figure 3:
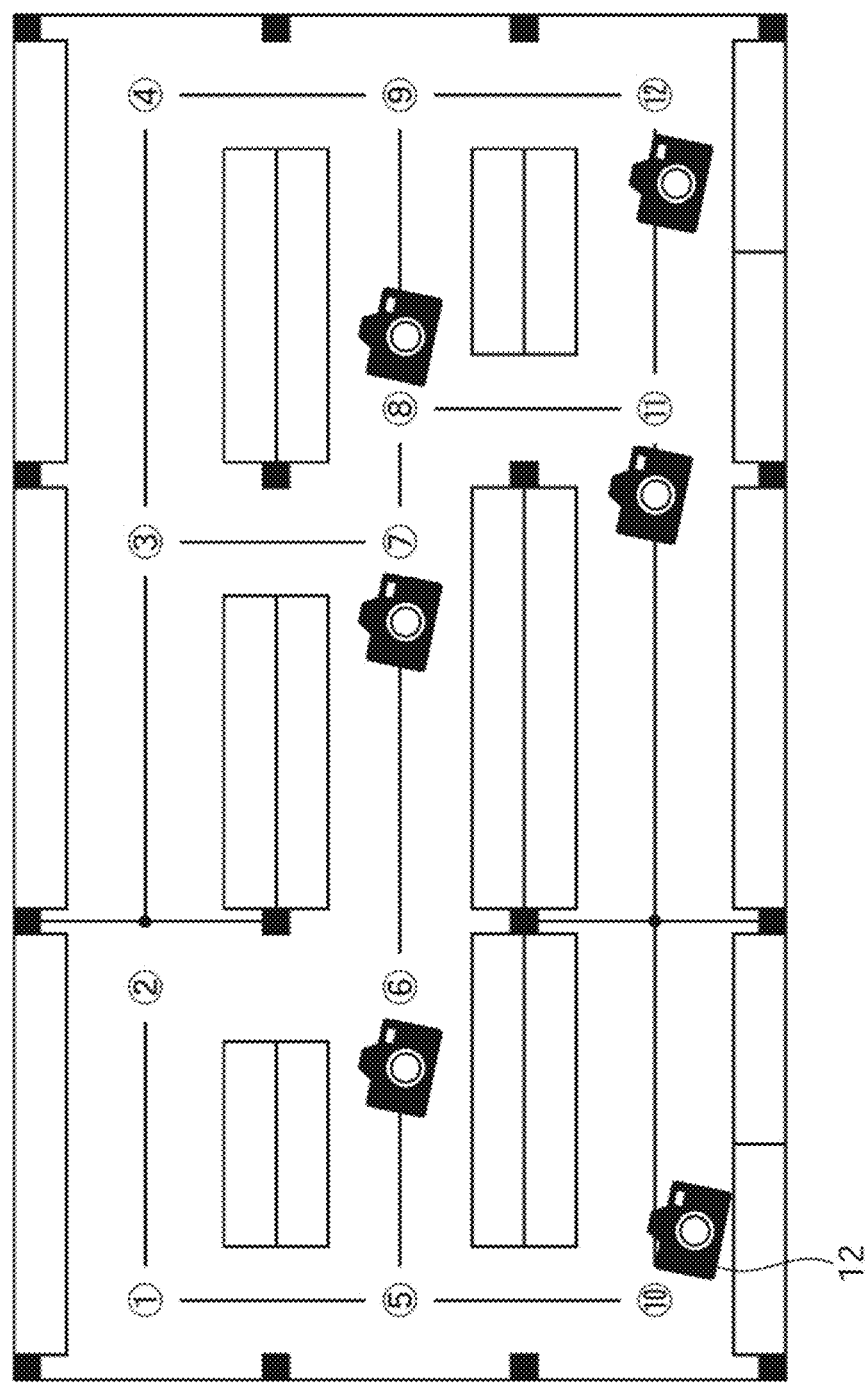
FIG. 3 is a schematic view illustrating a state of a workspace when preparing a database.
Figure 4:
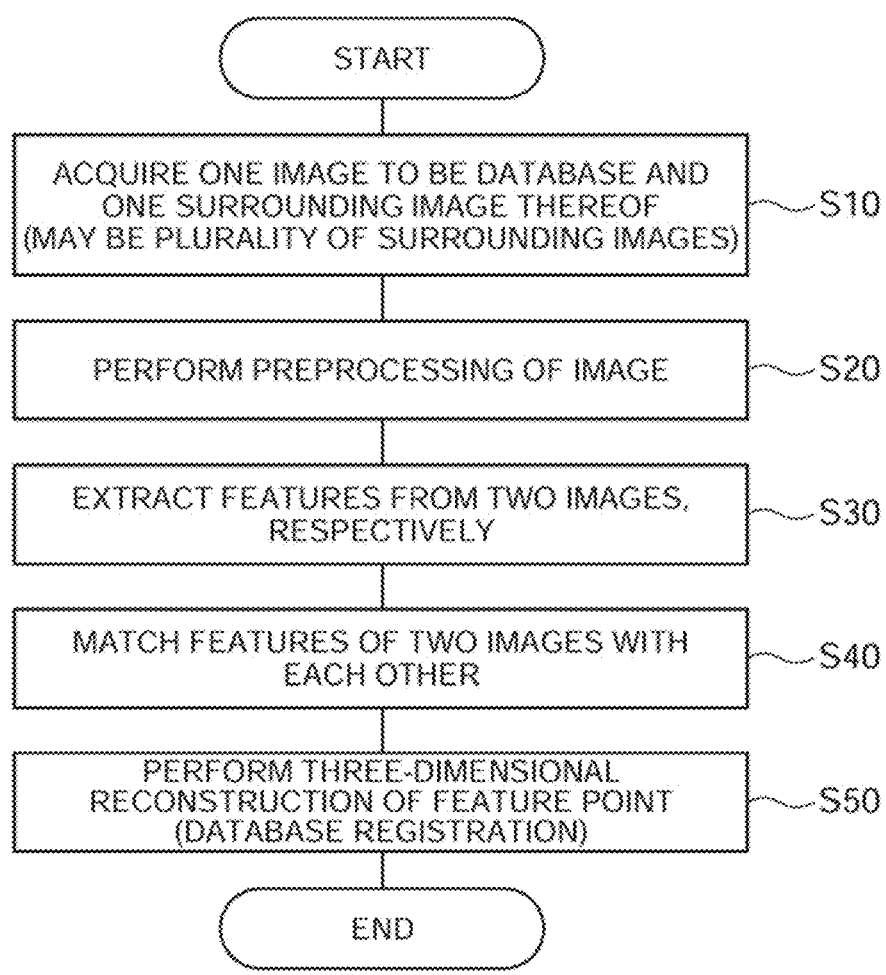
FIG. 4 is a flowchart illustrating a method the preparing the database.

Here, the method for preparing the database will be described with reference to FIG. 3 to FIG. 6. The database is prepared in advance before the moving body 50 actually performs an operation in the workspace F while estimating the own-position. The database is prepared by acquiring an image at a point important for travel in the workspace E and by calculating information required for position estimation to be the database and to be linked to a map of the workspace E. In FIG. 3, an important point, for example, is a position numbered from "1" to "12". In the following description, a position with a number "1" will be referred to as the "first important point", Similarly, a position with the other number will be referred to as the "n-th important point". Note that, here, it is described that the moving body 50 illustrated in FIG. 2 is used for preparing the database. As described below since the own-position estimating unit 26 has a function of extracting the feature from the image or a function of matching the images with each other, the own-position estimating unit 26 performs various processings for preparing the database. However, a device to be used for preparing the database is not particularly limited, and any device may be adopted insofar as the device is capable of executing the following processing, FIG. 4 is a flowchart illustrating the method for preparing the database. First, the camera 12 acquires one image to be the database, and acquires one surrounding image thereof (may be plurality of surrounding images) (step S10: an image acquisition step). For example, in a case where an image at the first important point is to be the database, the camera 12 acquires one image at the first important point, and acquires another image from the vicinity of the first important point. Next, the own-position estimating unit 26 performs preprocessing of the image such that the feature can be extracted (step S20). For example, the camera 12 may include a fisheye lens such that a wide range can be photographed. In this case, since an object in the image is distorted, the image is adjusted to an image close to the actual view by performing the preprocessing.

Figure 5:
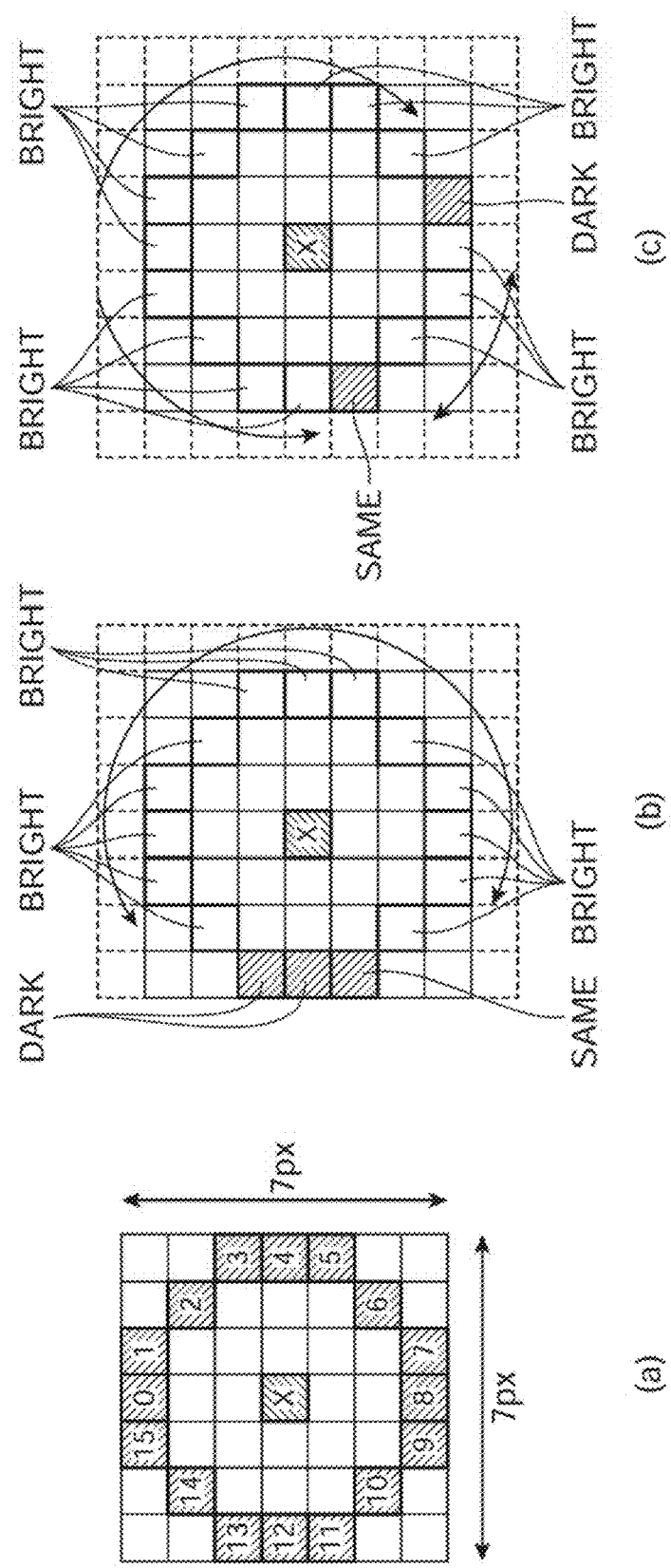
FIGS. 5(a), 5(b), and 5(c) are diagrams for illustrating a method for extracting a feature.

Next, the own-position estimating unit 26 extracts features from two images, respectively (step S30: an extraction step). Here, a method for extracting the feature in the image will be described with reference to FIG. 5. FIG. 5 is a diagram for illustrating the method for extracting the feature. As illustrated in FIG. 5(a), the own-position estimating unit 26 compares the luminance of a determination pixel X with the luminance of a surrounding pixel (here, 16 pixels) to be stratified into three patterns of "bright", "dark", and "same". For example, the own-position estimating unit 26 determines a surrounding pixel in which a relationship of "Determination Pixel (X)–Surrounding Pixel (i)>Light-Dark Threshold Value" is established as "bright", determines a surrounding pixel in which a relationship of "Determination Pixel (X)–Surrounding Pixel (i)<Light-Dark Threshold Value" is established as "dark", and determines a surrounding pixel in which a relationship of "Absolute Value of (Determination Pixel (X)–Surrounding Pixel (i))<Light-Dark Threshold Value" is established as "same".

Figure 6:
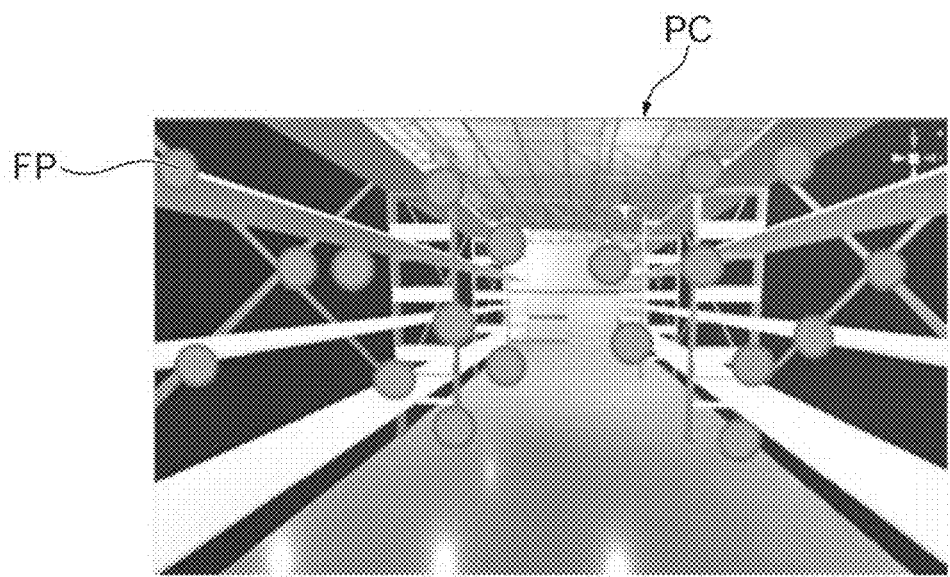
FIG. 6 is a diagram illustrating an image acquired b a camera and the extracted feature.

Here, in a case where the number of consecutive surrounding pixels of "bright" or "dark" is greater than or equal to the corner threshold value, the own-position estimating unit 26 extracts the determination pixel X as the feature in the image. For example, in a case where the corner threshold value is "12", the determination pixel X in FIG. 5(b) is extracted as the feature since the number of consecutive surrounding pixels of "bright" is greater than or equal to 12. The determination pixel X in FIG. 5(c) is discarded since the number of consecutive surrounding pixels of "bright" is only 11, and the determination pixel X is not the feature. Accordingly, as illustrated in FIG. 6, corner portions or the like of structural objects such as the shelf, the floor, the ceiling, and the wall in an image PC are extracted as the feature (a feature point FP). In addition, in a case where the cargo, the installation object, the moving body, and the like are also in the image, corner portions of such objects are also extracted as the feature. Note that, a default value set in advance may be used as the light-dark threshold value and the corner threshold value, before the determination threshold value adjusting unit 31 performs the adjustment Herein, the pixel extracted as the feature may be referred to as the "feature point FP". Note that, the feature in the image that is used in the own-position estimation may be not only a point, but also a line, a predetermined shape, and the like. That is, the feature is not limited to any mode insofar as the feature is a portion that can be extracted as a discriminative portion in the image by image processing and is a portion that can be matched with a portion extracted in the other image. Note that, in this embodiment, the method illustrated in FIG. 5 is exemplified as a method for extracting the feature point, but the extraction method is not particularly limited. In addition, in a case where another method is adopted as the extraction method, a threshold value according to the extraction method may be used instead of the light-dark threshold value and the corner threshold value as described above.

Figure 7:
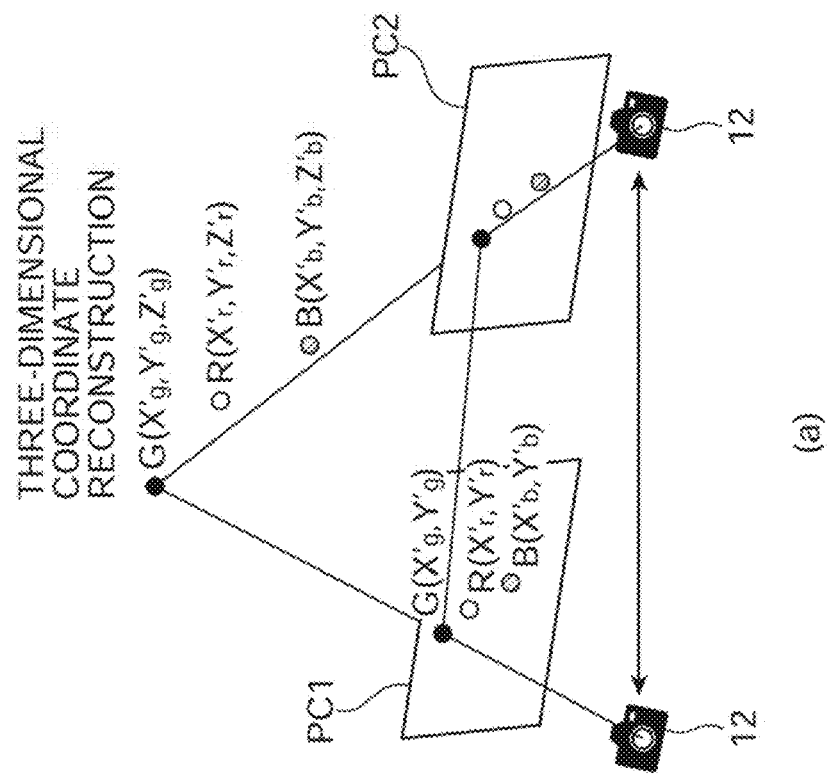
FIGS. 7(a) and 7(b) are conceptual diagrams illustrating a method for acquiring three-dimensional coordinates of the feature.

Returning to FIG. 4, the own-position estimating unit 26 matches the features of two images with each other (step S40). Then, the own-position estimating unit 26 performs three-dimensional reconstruction of the feature to be registered as the database. In the database, position information of the important point (a position in which an image is acquired), image coordinates of the feature in the image, and three-dimensional coordinates of the feature are registered by being associated with each other. Note that, its the position information, the posture of the camera 12 when photographing is also included. For example, as illustrated in FIG. 7, in an image PC1 at the important point, feature points G, R, and B are extracted, and image coordinates thereof are specified. In addition, position information of a location in which the image PC1 is acquired is also specified. In an image PC2 acquired around the important point, the feature points G, R, and B are also extracted, and the image coordinates thereof are also specified. In addition, position information of a location in which the image PC2 is acquired is also specified. A positional relationship between a surrounding photographing position and the important point is grasped by a method such as the link of an odometry value or the estimation from the in age. The own-position estimating unit 26 matches the features of the image PC1 and the image PC2 with each other. Accordingly, the own-position estimating unit 26 is capable of acquiring three-dimensional coordinates of the feature points G, R, and B in the manner of triangulation.

Returning to FIG. 4, in a case where the processing of step S50 is ended, making the database of one image is ended. The moving body 50 moves to the next important point, acquires an image at the important point by the camera 12, and performs again the processing of FIG. 4. As described above, the database of images at all important points in the workspace E is made. The prepared database is stored in the storage unit 24.

Figure 10:
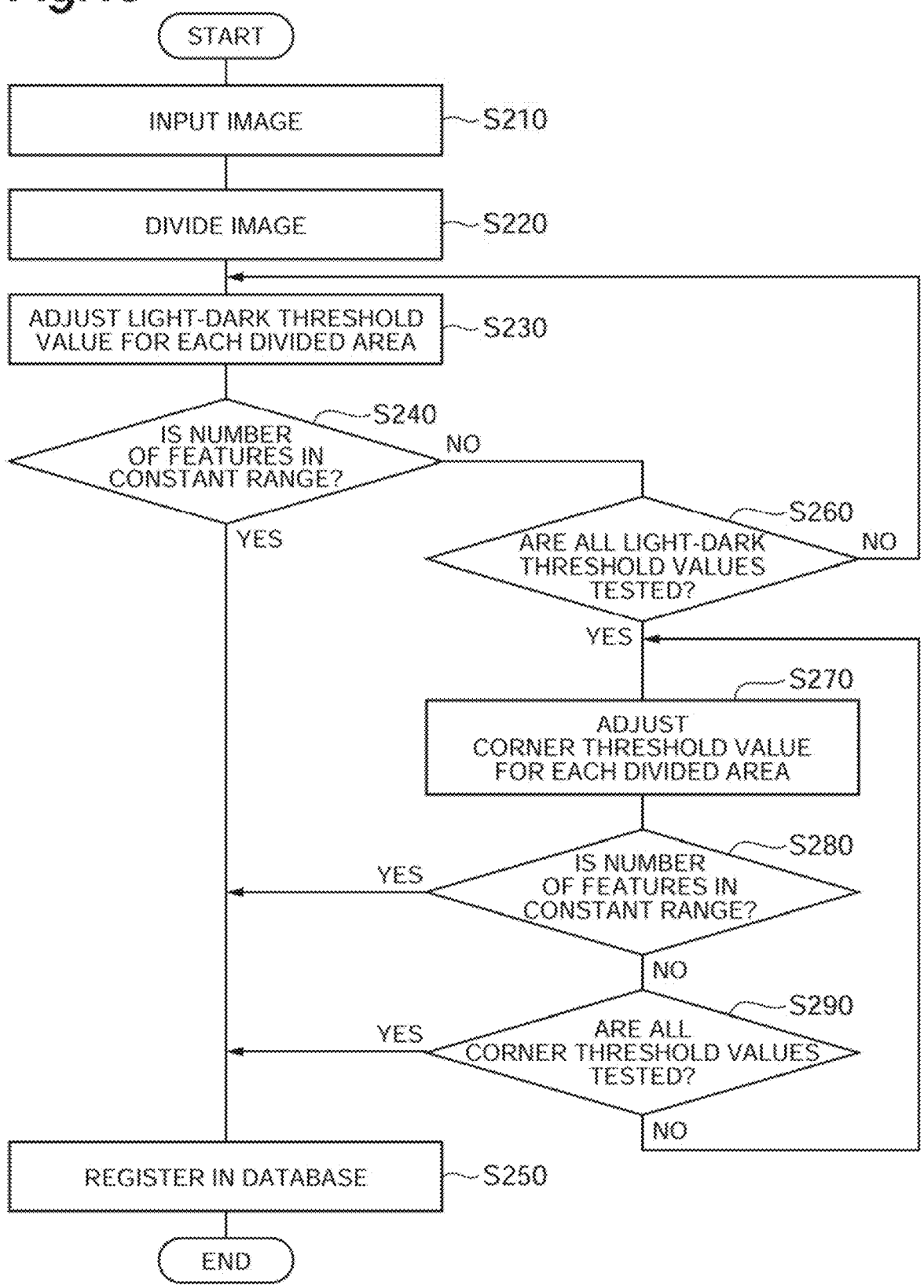
FIG. 10 is a flowchart illustrating processing details of a determination threshold value adjusting unit.
Figure 11:
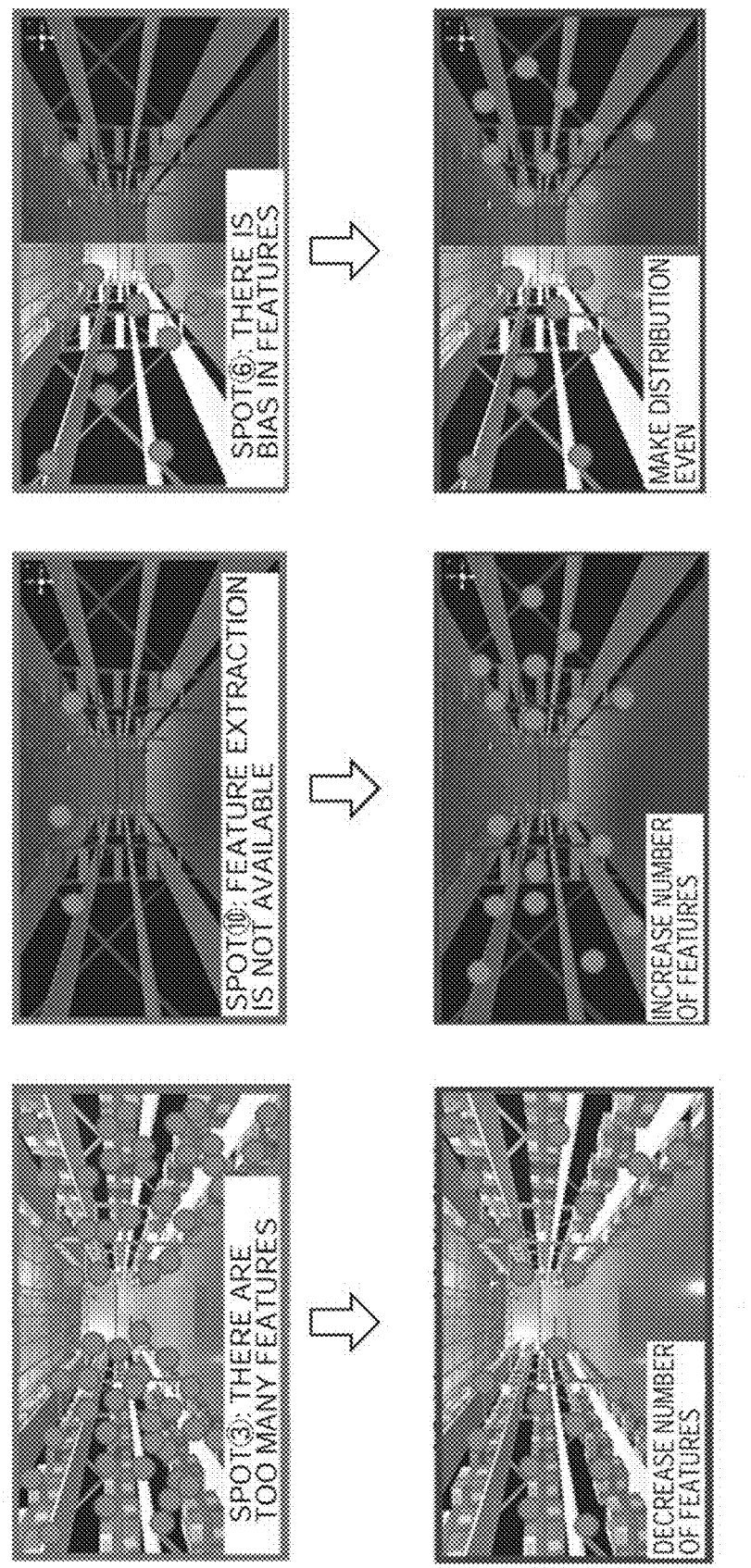
FIGS. 11(a), 11(b), and 11(c) are images illustrating states of feature points before and after a determination threshold value is adjusted by a determination threshold value adjusting unit.

Next, the determination threshold value adjusting unit 31 will be described with reference to FIG. 10 and FIG. 11. FIG. 10 is a flowchart illustrating processing details of the determination threshold value adjusting unit 31. FIG. 11 is an image illustrating the state of the feature point FP before and after the determination threshold value is adjusted by the determination threshold value adjusting unit 31. In FIG. 11, the upper side is an image before the adjustment, and the lower side is an image after the adjustment. The determination threshold value adjusting unit 31 evaluates a distribution mode of the features extracted from the image acquired by the camera 12, and adjusts the determination threshold value for extracting the feature on the basis of an evaluation result.

For example, as illustrated in an image on the upper side of FIG. 11(a), there are too many features at the third important point. In this case, computational burden increases, and it is difficult to perform the own-position estimation in real time. Accordingly, as illustrated in an image on the lower side of FIG. 11(a), the determination threshold value adjusting unit 31 adjusts the determination threshold value, and decreases the number of features. In addition, as illustrated in an image on the upper side of FIG. 11(b), there are too few features at the tenth important point. In this case, it is difficult to perform the own-position estimation. Accordingly, as illustrated in an image on the lower side of FIG. 11(b), the determination threshold value adjusting unit 31 adjusts the determination threshold value, and increases the number of features. The determination threshold value adjusting unit 31 adjusts the determination threshold value with respect to an image in a certain position, and then, links the determination threshold value to position information corresponding to the image to be registered in the database. That is, in the example of FIG. 11(a), the determination threshold value adjusting unit 31 links the determination threshold value for decreasing the feature to the position information of the third important point to be registered. In the example of FIG. 11(b), the determination threshold value adjusting unit 31 links the determination threshold value for increasing the feature to the position information of the tenth important point to be registered.

In addition, as illustrated in an image on the upper side of FIG. 11(c), at the sixth important point, a suitable number of features are evenly distributed in the left area, whereas there are few features in the right area. As a result thereof, a bias occurs in the distribution of the features when seen in the entire image. Accordingly, as illustrated in an image on the lower side of FIG. 11(c), the determination threshold value adjusting unit 31 adjusts the determination threshold value of the right area, and increases the number of features in the right area. As a result thereof the distribution of the features is even when seen as the entire image. As described above, the determination threshold value adjusting unit 31 divides the image in the certain position into a plurality of areas. Then, it is possible to individually adjust the determination threshold value with respect to each divided area. The determination threshold value adjusting unit 31 also registers a division pattern in the database together with the determination threshold value. In the example of FIG. 11(c), the determination threshold value adjusting unit 31 links the determination threshold value for increasing the feature in the right half area to the position information of the sixth important point to be registered together with the division pattern in which the image is divided into the left half and the right half. Accordingly, an image linked to predetermined position information in the database is divided into a plurality of areas, and the determination threshold values are different from each other in one area and the other area (in the example of FIG. 11(c), the left half area and the right half area).

Next, processing details of the determination threshold value adjusting unit 31 will be described with reference to FIG. 10. Note that, the processing illustrated in FIG. 10 may be executed between step S30 and step S40 of FIG. 4, or may be executed after the processing of FIG. 4 is completely ended. As illustrated in FIG. 10, the determination threshold value adjusting unit 31 inputs an image to be adjusted (step S210). Next, the determination threshold value adjusting unit 31 divides the image into a plurality of areas (step S220). In this case, how to divide the image is not particularly limited. For example, the determination threshold value adjusting unit 31 may divide the image into two portions on the left and right, may divide the image into four portions on the left, right, top, and bottom, or may further segmentalize the image. Next, the determination threshold value adjusting unit 31 adjusts the light-dark threshold value for each divided area (step S230: a determination threshold value adjustment step), Note that, in the first step S230, a default value may be used as the light-dark threshold value. Next, the determination threshold value adjusting unit 31 determines whether or not the number of features falls within a constant range (step S240). The determination threshold value adjusting unit 31 determines the number of features with respect to each of the divided areas. The range of the number of features can be arbitrarily set. In addition, as the number of divided areas increases, a size per one area decreases. Accordingly, the range of the number of features is suitably set in accordance with the number of divided areas. In step S240, in a case where it is determined that the number of features is in the constant range with respect to all the areas, the determination threshold value adjusting unit 31 links the determination threshold value, the division pattern, the number of features, and the like to the corresponding position information to be registered in the database (step S250).

In step S240, in a case where it is determined that the number of features is not in the constant range with respect to all the areas, the determination threshold value adjusting unit 31 determines whether or not all the light-dark threshold values are tested (step S260). In step S260, in a case where it is determined that there are the light-dark threshold values that are not tested yet, the processing is repeated again from step S230. Note that, in step S230 after step S260, the other light-dark threshold value can be used. In this case, the determination threshold value adjusting unit 31 may set a new light-dark threshold value in consideration of the distribution mode. For example, in a case where the image is too dark, and there are obviously too few features, the determination threshold value adjusting unit 31 may greatly decrease the light-dark threshold value. In addition, in a case where the number of features is in the constant range with respect to a partial area in the plurality of areas, the determination threshold value adjusting unit 31 may not adjust the determination threshold value with respect to the area.

In step S260, in a case where it is determined that all the light-dark threshold values are tested, the determination threshold value adjusting unit 31 adjusts the corner threshold value for each of the divided areas (step S270: a determination threshold value adjustment step). Next, the determination threshold value adjusting unit 31 determines whether or not the number of features falls within the constant range (step S280). In step S280, in a case where it is determined that the number of features is in the constant range with respect to all the areas, the determination threshold value adjusting unit 31 links the determination threshold value, the division pattern, the number of features, and the like to the corresponding position information to be registered in the database (step S250). In step S280, in a case where it is determined that the number of features is not in the constant range with respect to all the areas, the determination threshold value adjusting unit 31 determines whether or not all the corner threshold values are tested (step S290). In step S290, in a case where it is determined that there are the light-dark threshold values that are not tested yet, the processing is repeated again from step S270. In step S290, in a case where it is determined that all the corner threshold values are tested with respect to all the areas, the determination threshold value adjusting unit 31 links the determination threshold value, the division pattern, the number of features, and the like to the corresponding position information to be registered in the database (step S250).

Figure 12:
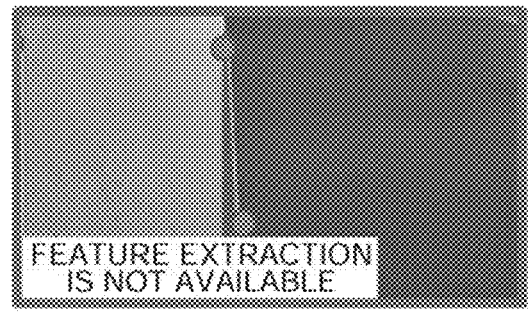
FIG. 12 is an image illustrating a state of a position that is registered as a travel caution area.

Note that, in the database, a position in which the number of features is less than a predetermined amount even when adjusting the determination threshold value may be registered as a travel caution area. That is, in step S290 described above, in a case where it is determined that all the corner threshold values are tested with respect to all the areas, the determination threshold value adjusting unit 31 registers the corresponding position information as the travel caution area in which excellent own-position estimation cannot be performed. In this case, the moving body 50 may travel on the basis of only the own-position according to odometry without using the result of estimating the own-position. For example, as illustrated in FIG. 12, in a case where the object itself in the image is simple, and the feature cannot be extracted, such a case is registered as the travel caution area.

Figure 8:
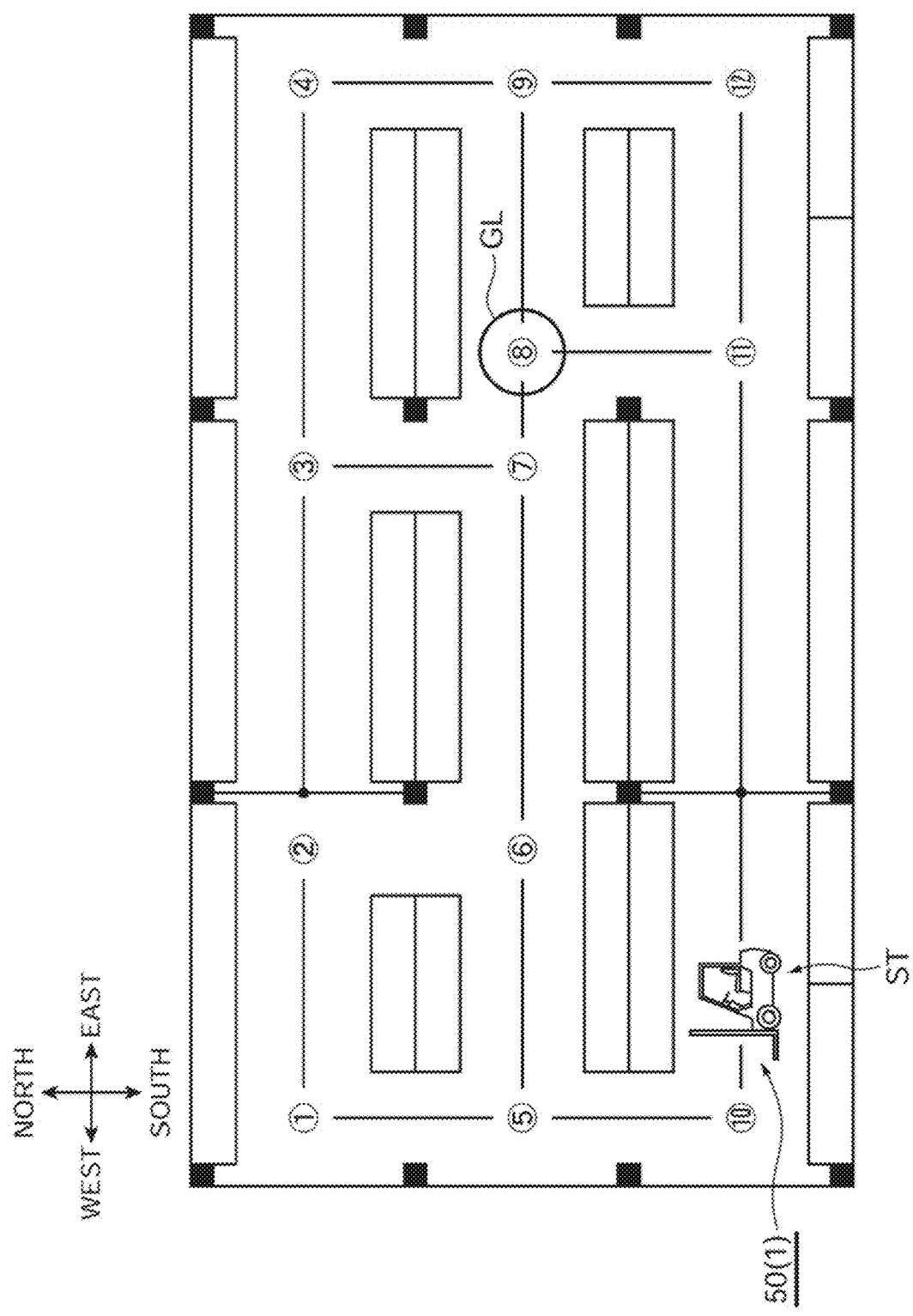
FIG. 8 is a schematic view illustrating a state when the moving body autonomously travels.

Next, a method for the moving body 50 to autonomously travel, and an own-position estimating method of the own-position estimating unit 26 for autonomous travel will be described with reference to FIG. 8 and FIG. 9. For example, the moving body 50 autonomously travels to the eighth important point that is a destination position GL, from a current position ST illustrated in FIG. 8. In this case, the own-position estimating unit 26 estimates where the moving body 50 currently exists. Accordingly, the Own-position deciding unit 28 is capable of deciding that the current position ST is "2 m east from the tenth important point". Then, the route planning unit 21 plans a route of "48 m east to the eleventh important point and 16 m north to the eighth important point". Accordingly, the moving body autonomously travels.

Figure 9:
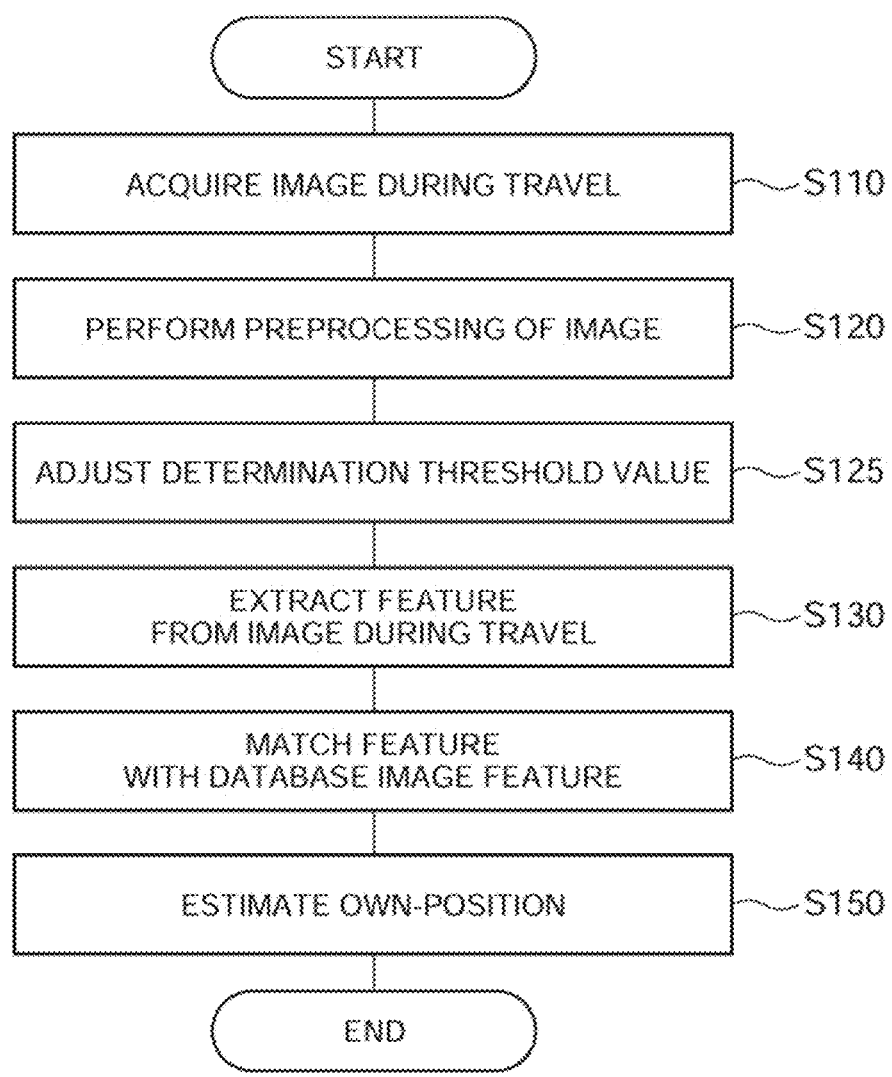
FIG. 9 is a flowchart illustrating a method fir estimating the own-position of the moving body.

FIG. 9 is a flowchart illustrating a method for estimating the own-position of the moving body 50. The own-position estimating unit 26 executes processing illustrated in FIG. 9 in order to estimate the own-position of the moving body 50. As illustrated in FIG. 9, the own-position estimating unit 26 acquires an image during the travel of the moving body 50 from the camera 12 (step S110: an image acquisition step), For example, the camera 12 acquires an image in the current position ST in the vicinity of the tenth important point (refer to FIG. 8). Next, the own-position estimating unit 26 performs the preprocessing of the image such that a feature can be extracted (step S120).

Next, the determination threshold value adjusting unit 31 adjusts the determination threshold value for extracting the feature (step S125: a determination threshold value adjustment step). The determination threshold value adjusting unit 31 acquires the database in a state where the determination threshold value is adjusted, and adjusts the determination threshold value on the basis of the determination threshold value linked to each of the position information items in the database. Note that, since step S125 is processing prior to step S150 described below in which strict own-position estimation is performed, in step S125, the determination threshold value adjusting unit 31 may read out the database to be used and the determination threshold value linked to the database, on the basis of the own-position information of one preceding frame. In addition, in the initial position (that is, in a case where there is no own-position information of one preceding frame), the own-position may be estimated from an image that is initially given by a manager. Alternatively the own-position estimation is performed with respect to all the databases, and a result evaluated to have the highest estimation accuracy (for example, the highest matching success rate) may be grasped as the own-position and set to the initial position.

Next, the own-position estimating unit 26 extracts the feature from the image during the travel (step S130: an extraction step). In this case, the own-position estimating unit 26 extracts the feature by using the determination threshold value adjusted in step S125. Note that, in steps S120 and S130, processing to the same effect as steps S20 and S30 of FIG. 4 is performed. Accordingly, in a case where the image PC as illustrated in FIG. 6 is acquired, the feature point FP is acquired.

Next, the own-position estimating unit 26 matches the feature extracted in step S130 with the feature in the image of the database (step S140: an estimation step). Then, the own-position estimating unit 26 estimates the own-position of the moving body 50 (step S150: an estimation step).

For example, in a case where an image similar to the image PC illustrated in FIG. 6 is obtained while the moving body 50 travels, the own-position estimating unit 26 is capable of extracting a plurality of feature points EP similar to that of FIG. 6. Then, the own-position estimating unit 26 compares the feature point with the feature in the image of the database. In a case where the image PC illustrated in FIG. 6 is obtained at the tenth important point when preparing the database, and the plurality of feature points FP illustrated in FIG. 6 are extracted, the own-position estimating unit 26 is capable of matching the feature point extracted in step S130 with the feature point FP illustrated in FIG. 6. Note that, examples of a method for matching the feature points with each other include a method for calculating a feature amount descriptor of the feature point and for matching a feature point with the shortest distance among the feature points in the database, but the method is not particularly limited, and known methods may be used.

Here, it is assumed that the location photographed during the travel is shifted from the tenth important point, and the photographing posture during the travel is shifted from the photographing posture when preparing the database. In this case, the image photographed during the travel and the image coordinates of the feature point are slightly shifted from the image PC and the image coordinates of the feature point FP in FIG. 6. Accordingly, in step S150, the own-position estimating unit 26 links the coordinates of arbitrary three feature points from the database to three feature points in the image during the travel. Then, the own-position estimating unit 26 estimates the position and the posture of the moving body 50 by using a technology of a known three-point method. Note that, three feature points that are used in step S150 are randomly selected from a large number of feature points in the image.

Next, the function and effect of the own-position estimating device 1, the moving body 50, the own-position estimating method, and an own-position estimating program according to this embodiment will be described.

The own-position estimating device 1 is for estimating the own-position of the moving body by matching the feature extracted from the acquired image with the database in which the position information and the feature are associated with each other in advance. Here, in a case where the own-position estimating unit 26 uses only a constant determination threshold value when extracting the feature from the image, the number of features or the distribution of the features may be uneven in accordance with the travel position of the moving body 50 (for example, refer to the image on the upper side of FIG. 11). In contrast, the own-position estimating device 1 according to this embodiment includes the determination threshold value adjusting unit 31 adjusting the determination threshold value for extracting the feature. The determination threshold value adjusting unit 31 acquires the database in a state where the determination threshold value is adjusted, and adjusts the determination threshold value on the basis of the determination threshold value linked to each of the position information items in the database. Accordingly, the determination threshold value adjusting unit 31 is capable of adjusting the determination threshold value to a suitable value, in accordance with the travel position of the moving body 50. The own-position estimating unit 26 is capable of extracting the feature from the image in a state where the number of features or the distribution of the features is prevented from being uneven, by using the determination threshold value adjusted to the suitable value as described above. Accordingly, the own-position estimating device 1 is capable of suppressing a decrease in the accuracy of the own-position estimation due to few features to be extracted and a bias in the distribution. In addition, the own-position estimating device 1 is capable of suppressing a decrease in a processing speed due to too many features to be extracted. As described above, the own-position estimating device 1 is capable of estimating the own-position in real time with a high accuracy regardless of the travel position of the moving body 50.

The determination threshold value adjusting unit 31, for example, may adjust at least one of the light-dark threshold value for determining whether the surrounding pixel is bright or dark with respect to the determination pixel to be determined as the feature or not, and the corner threshold value for determining the number of consecutive surrounding pixels determined to be bright or dark, as the determination threshold value.

The image linked to the predetermined position information in the database may be divided into a plurality of areas, and the determination threshold values may be different from each other in one area and the other area. Accordingly, even in a position where the distribution of the features in the image is likely to be biased (for example, refer to the image on the upper side of FIG. 11(*c*)), the own-position estimating unit 26 is capable of extracting the feature with a suitable determination threshold value according to the area.

The position in which the number of features is less than a predetermined amount even when adjusting the determination threshold value may be registered as the travel caution area in the database. In this case, it is possible to rapidly take measures when the moving body 50 travels in the travel caution area. For example, in the travel caution area, the moving body 50 may switch to travel using other means (for example, travel support based only on odometry) without using the result of estimating the own-position using the image. Alternatively, in the travel caution area, the moving body 50 may travel at a lower speed than usual.

The own-position estimating device 1 according to one aspect of the present disclosure is the own-position estimating device 1 for estimating the own-position of the moving body by matching the feature extracted from the acquired image with the database in which the position information and the feature are associated with each other in advance, the own-position estimating device 1 including: the camera 12 acquiring the image; the own-position estimating unit 26 extracting the feature from the image acquired by the camera 12; and the determination threshold value adjusting unit 31 adjusting the determination threshold value for extracting the feature, in which the determination threshold value adjusting unit 31 evaluates the distribution mode of the features extracted from the image acquired by the camera 12, and adjusts the determination threshold value for extracting the feature on the basis of the evaluation result, and the own-position estimating unit 26 extracts the feature from the image by using the determination threshold value adjusted by the determination threshold value adjusting unit 31.

The moving body 50 according to one aspect of the present disclosure includes the own-position estimating device 1 described above.

The own-position estimating method according to one aspect of the present disclosure is an own-position estimating method for estimating the own-position of the moving body 50 by matching the feature extracted from the acquired image with the database in which the position information and the feature are associated with each other in advance, the method including: the image acquisition step of acquiring the image; the extraction step of extracting the feature from the image acquired in the image acquisition step; the estimation step of estimating the own-position of the moving body 50 by matching the feature extracted in the extraction step with the database; and the determination threshold value adjustment step of adjusting the determination threshold value for extracting the feature, in which in the determination threshold value adjustment step, the database in a state in which the determination threshold value is adjusted is acquired, and the determination threshold value is adjusted on the basis of the determination threshold value linked to each of the position information items in the database, and in the extraction step, the feature is extracted from the image by using the determination threshold value adjusted in the determination threshold value adjustment step.

The own-position estimating program according to one aspect of the present disclosure is an own-position estimating program for estimating the own-position of the moving body 50 by matching the feature extracted from the acquired image with the database in which the position information and the feature are associated with each other in advance, the program allowing the controller to execute: the image acquisition step of acquiring the image; the extraction step of extracting the feature from the image acquired in the image acquisition step; the estimation step of estimating the own-position of the moving body by matching the feature extracted in the extraction step with the database; and the determination threshold value adjustment step of adjusting the determination threshold value for extracting the feature, in which in the determination threshold value adjustment step, the database in a state in which the determination threshold value is adjusted is acquired, and the determination threshold value is adjusted on the basis of the determination threshold value linked to each of the position information items in the database, and in the extraction step, the feature is extracted from the image by using the determination threshold value adjusted in the determination threshold value adjustment step.

According to the own-position estimating device 1, the moving body 50, the own-position estimating method, and the own-position estimating program, it is possible to obtain the same effects as those of the own-position estimating device 1 described above.

The present disclosure is not limited to the embodiment described above.

Figure 13:
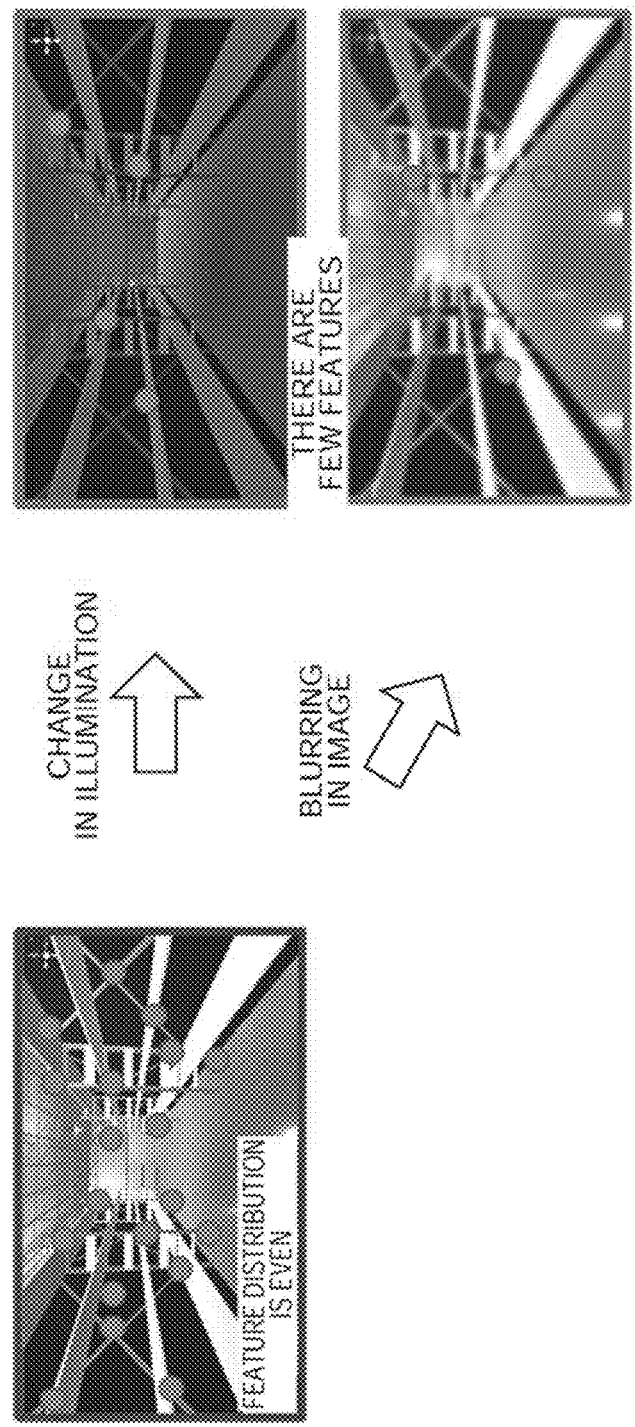
FIG. 13 is an image illustrating a state in which a distribution mode of the features extracted when traveling is changed from that of the database.

The own-position estimating unit 26 may further have other functions in addition to the functions described in the above embodiment. For example, the own-position estimating unit 26 may determine whether or not the distribution mode of the extracted features is changed from that of the database. In a case where the distribution mode of the features extracted during the travel is changed from that of the database, an abnormality such as a change in the surrounding environment may occur in which the own-position estimation with an excellent accuracy cannot be performed. Accordingly, it is possible to take measures by the own-position estimating unit 26 determining the situation described above. For example, as illustrated in the left image of FIG. 13, the distribution of the features is even in each of the areas when preparing the database, but as illustrated in the right image of FIG. 13, the number of features may decrease due to a change in an illumination or the occurrence of blurring in the image. In such a case, the own-position estimating unit 26 determines that the distribution mode of the extracted features (the right mode of FIG. 13) is changed from that of the database (the left mode of FIG. 13). In the determination, a threshold value may be set with respect to the number of feature points or the like. In a case where it is determined that there is a change, the moving body 50 may take measures such as giving a warning or changing travel processing. For example, the moving body 50 may decrease a travel speed, adjust again the determination threshold value, and update the database. Alternatively, the moving body 50 may switch to travel using other means (for example, travel support based only on odometry) without using the result of estimating the own-position using the image. Note that, a plurality of sets of determination threshold values may be included in one database. For example, the database may include a set of determination threshold values in the morning hours and a set of determination threshold values in the evening hours.

In the embodiment described above, all the constituents of the own-position estimating device are included in the moving body 50. Alternatively, the managing unit 2 may have a part of the functions of the own-position estimating device.

REFERENCE SIGNS LIST

1: own-position estimating device, 12: camera (image acquiring unit), 26: own-position estimating unit (extracting unit, estimating unit), 31: determination threshold value adjusting unit, 50: moving body.

The invention claimed is:

1. An own-position estimating device for estimating an own-position of a moving body by matching a feature extracted from an acquired image with a feature present within a database in which position information and the feature are associated with each other in advance, the device comprising:
   an image acquiring unit acquiring the image;
   an extracting unit extracting the feature from the image acquired by the image acquiring unit;
   an estimating unit estimating the own-position of the moving body by matching the feature extracted by the extracting unit with the feature present within the database; and
   a determination threshold value adjusting unit adjusting a determination threshold value for extracting the feature from the image,
   wherein the determination threshold value adjusting unit acquires the feature present within the database in a state in which the determination threshold value is adjusted, and adjusts the determination threshold value on the basis of the determination threshold value linked to each of the position information in the database, and
   the extracting unit extracts the feature from the image by using the determination threshold value adjusted by the determination threshold value adjusting unit.

2. The own-position estimating device according to claim 1,
   wherein the determination threshold value adjusting unit adjusts at least one of
      a light-dark threshold value for determining whether a surrounding pixel is bright or dark with respect to a determination pixel to be determined as the feature from the image or not, and
      a corner threshold value for determining the number of consecutive surrounding pixels determined to be bright or dark, as the determination threshold value.

3. The own-position estimating device according to claim 1,
   wherein an image linked to predetermined position information in the database is divided into a plurality of areas, and the determination threshold values are different from each other in one area and the other area.

4. The own-position estimating device according to claim 1,
   wherein the extracting unit determines whether or not a distribution mode of the extracted feature is changed from that of the database.

5. The own-position estimating device according to claim 1,
   wherein a position in which a number of features is less than a predetermined amount when adjusting the determination threshold value is registered as a travel caution area in the database.

6. A moving body, comprising:
   the own-position estimating device according to claim 1.

7. An own-position estimating method for estimating an own-position of a moving body by matching a feature extracted from an acquired image with a feature present within a database in which position information and the feature are associated with each other in advance, the method comprising:
   an image acquisition step of acquiring the image;
   an extraction step of extracting the feature from the image acquired in the image acquisition step;
   an estimation step of estimating the own-position of the moving body by matching the feature extracted in the extraction step with the feature present within the database; and
   a determination threshold value adjustment step of adjusting a determination threshold value for extracting the feature from the image,
   wherein in the determination threshold value adjustment step, the feature present within the database in a state in which the determination threshold value is adjusted is acquired, and the determination threshold value is adjusted on the basis of the determination threshold value linked to each of the position information in the database, and
   in the extraction step, the feature is extracted from the image by using the determination threshold value adjusted in the determination threshold value adjustment step.

* * * * *